United States Patent
Rubin

(10) Patent No.: US 7,894,072 B1
(45) Date of Patent: Feb. 22, 2011

(54) LASER-BASED GAS DIFFERENTIAL SPECTRAL ANALYSIS

(75) Inventor: Stuart H. Rubin, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 247 days.

(21) Appl. No.: 12/268,018

(22) Filed: Nov. 10, 2008

(51) Int. Cl.
*G01B 9/02* (2006.01)

(52) U.S. Cl. .................................................. 356/456

(58) Field of Classification Search .......... 356/451–453
See application file for complete search history.

(56) References Cited

U.S. PATENT DOCUMENTS

| | | | |
|---|---|---|---|
| 5,764,362 A * | 6/1998 | Hill et al. ..................... | 356/487 |
| 5,899,984 A | 5/1999 | Wang et al. | |
| 7,047,226 B2 | 5/2006 | Rubin | |
| 7,115,229 B2 | 10/2006 | Zenhausern | |
| 7,248,370 B2 * | 7/2007 | Jones ........................ | 356/454 |
| 2002/0145425 A1 | 10/2002 | Ebbels et al. | |
| 2003/0207271 A1 | 11/2003 | Holwitt et al. | |

OTHER PUBLICATIONS

Rubin, S. H., Murthy, S. N. J., Smith, M. H., Trajkovic, L. Kaser; Knowledge Amplification by Structured Expert Randomization; Journal; Dec. 2004; pp. 2317-2329; vol. 34; IEEE Transactions on Systems, Man, and Cybernetics.

Stuart H. Rubin, U.S. Appl. No. 12/243,049 (unpublished), Geodesic Search and Retrieval of Semi-Structured Databases.

* cited by examiner

*Primary Examiner*—Hwa S. A Lee

(74) *Attorney, Agent, or Firm*—Arthur K. Samora; Kyle Eppele

(57) ABSTRACT

A laser interferometer, such as a dual path Michelson interferometer, is used to generate fringe patterns resulting from one of a plurality of optical paths passing through a sample gas. An artificial neural network, such as, for example, a KASER neural network, is used to recognize patterns in the fringe interference patterns corresponding to known target gases.

9 Claims, 4 Drawing Sheets

LASER-BASED GAS DIFFERENTIAL SPECTRAL ANALYSIS

FEDERALLY-SPONSORED RESEARCH AND DEVELOPMENT

This invention (Navy Case No. 096129) is assigned to the United States Government and is available for licensing for commercial purposes. Licensing and technical inquiries may be directed to the Office of Research and Technical Applications, Space and Naval Warfare Systems Center, Pacific, Code 2112, San Diego, Calif., 92152; voice 619-553-2778; email T2@spawar.navy.mil.

FIELD OF THE INVENTION

This disclosure relates to knowledge amplification by structured expert randomization, and to the use of artificial neural network computing for spectral analysis of gases.

BACKGROUND OF THE INVENTION

Detection and identification of poisonous gases before they have the chance to do harm is performed by various means, examples being home-use gas detectors for carbon monoxide (CO) and hydrocarbons. In many instances, detection is based on threshold amounts of present concentration being relevant to toxic levels. By way of example, a CO detector normally triggers its alarm at either the toxic level (as in a vehicle) or at a level substantially above naturally occurring ambient levels.

Other techniques which may be more sensitive to low levels of potential toxic materials include molecular spectroscopy, chemical, or biological methods. These methods are often not portable, reliable, repeatable, broad-based, or do not provide a fast response time. These methods are too slow and costly to be practical in the context of some types of detection requirements, such as detection of rapidly dispersing toxic materials and detection of materials in the military environment.

Interferometers having multiple lasers could be used for gas detection, but this approach would be more costly and less accurate, since the output might not be fused into one picture for analysis. It is important to fuse one picture because interferometric images can embody a great deal of information—including the constituent gaseous elements, their relative concentrations, and the first derivative of the composition (i.e., rate of change). Additionally, it would be extremely advantageous if the output could be quickly and accurately interpreted to interpret the presence of toxic gases without placing the human operator at risk. One way to do this would be to incorporate an automatic means, such as a neural network, to interpret the interferometer output images.

SUMMARY OF THE INVENTION

A laser-based spectral analysis system in accordance with several embodiments of the invention includes a laser interferometer having a plurality of optical paths. The interferometer includes a plurality of lasers and mirrors that are arranged to provide two laser light paths that are received at respective photodiodes. A gas sample chamber is positioned in one of the optical paths and outside of at least another of said plural optical paths. Unknown gases that are in the sample chamber generate an interference pattern for the laser light passing through the chamber. The interference patterns for the laser are received at the photodiodes.

An oscilloscope can be connected to the photodiodes to detect the received interference patterns, and a plotter can be connected to the oscilloscope to plot differential fringe pattern as a detection output; the differential fringe patterns have different frequencies that are representative of the gases in the sample and the atmosphere. Stated differently, the fringe patterns have differences that result from sampling the atmosphere. A neural network can be employed to interpret the differences in the plotted fringe patterns to evaluate the gases that are present in the atmosphere without placing the human operator at risk. In one embodiment of the invention, a geodesic neural network is used to interpret the differential fringe patterns. In another embodiment of the invention, a Knowledge Amplification Employing Structured Expert Randomization (KASER) neural network can be used to analyze the differential fringe patterns.

A method for detecting target gas in accordance with several embodiments of the invention includes the step of providing a laser interferometer. The interferometer includes several lasers that can be implemented across plural optical paths. Another step includes affording a gas sample across at least a portion of one of said optical paths. The sample creates an interference pattern in at least one of the lasers. To accomplish the methods of the present invention, the interference pattern can be compared to another laser pattern that did not have a sample placed in its optical path, or the interference pattern can be evaluated to predetermined patterns from known atmospheric conditions. The method further includes the steps of comparing and analyzing the differences in fringe patterns using a neural network; a geodesic neural network, or a KASER-back-ended (i.e., symbolic) neural network may be used to accomplish the analysis step.

BRIEF DESCRIPTION OF THE DRAWINGS

The novel features of the present invention will be best understood from the accompanying drawings, taken in conjunction with the accompanying description, in which similarly-referenced characters refer to similarly-referenced parts, and in which.

DETAILED WRITTEN DESCRIPTION OF THE EMBODIMENTS

The present system and methods address the early detection of potentially hazardous gaseous substances at an early stage of contamination. One approach is to detect and measure the concentration of known poisonous gases in the atmosphere using a portable device. Such devices may be laser-based.

The technique makes it possible to detect any among a number of gases through the use of an interferometric-type device augmented by a neural network for performing pattern analysis on the interferometric patterns. One such network is a geodesic neural network, as described in U.S. patent application Ser. No. 12/243,049 by Stuart Harvey Rubin, entitled "Geodesic Search and Retrieval of Semi-Structured Databases", which is assigned to the same assigned as the present invention. Another neural network that could be used is the KASER neural network is described in U.S. Pat. No. 7,047,226, which issued to Stuart H. Rubin on May 16, 2006 for an invention entitled "System and Method for Knowledge Amplification Employing Structured Expert Randomization", and which is assigned to the same assignee as this patent application. Both the '049 patent application and the '226 patent are hereby incorporated by reference herein.

The device according to several embodiments of the present invention comprises a laser, the output of which is fed to a broad-based frequency-doubling crystal, for example Lithium Niobate, $LiNiO_4$, in a characteristic feedback loop. As the laser output is fed back through its feedback loop, various gases that are in the atmosphere cause interferences in the feedback pattern of the laser, according to the inherent absorption properties of the gases. The interferences can translate into unique patterns that can be interpreted to determine the presence/absence of various gases in the atmosphere.

According to various embodiments of the present invention, neural networks can use neural network computing techniques to learn to place these patterns in bijective correspondence with known benchmarks, which may include gaseous mixtures. In this manner, the presence of even trivial amounts of gases (especially harmful or poisonous gases) can be detected quickly and more or less measured.

Figure 1:
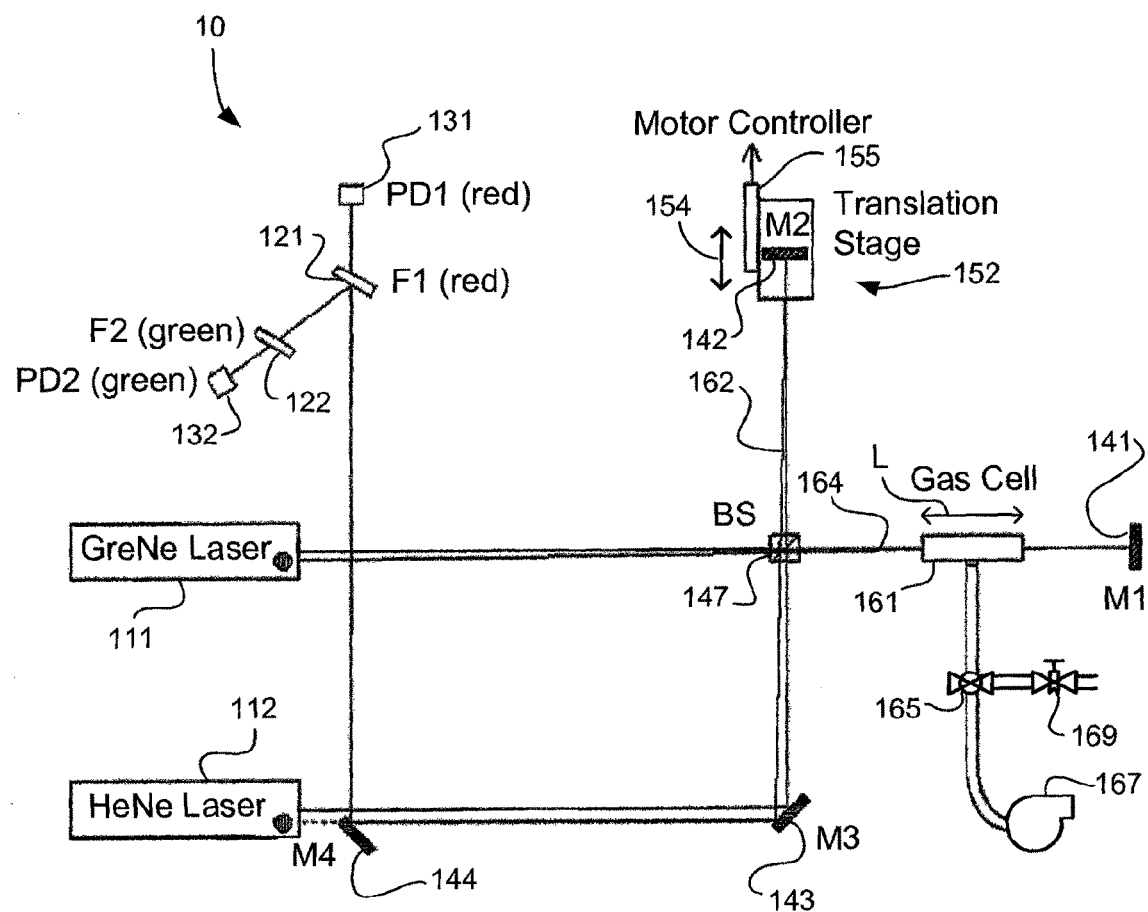
FIG. 1 is a diagram showing the configuration of the system and methods according to several embodiments of the present invention.

Michelson interferometers are known in the art as a means for determining the wavelength of a light beam and establishing an optical length standard, as well as a wave meter, to compare the wavelengths of two light sources, and to measure the index of refraction of air at two different wavelengths. The components used in a Michelson interferometer are shown as part of system 10 in FIG. 1. As shown, the system 10 includes two lasers, which are depicted as a 543 nanometer (nm) Neon laser (also known as a Green Neon, or "GreNe") laser 111 and a 633 nm red Helium-Neon (HeNe) laser 112. Also shown are red and green filters 121, 122, red and green photodetectors 131, 132, four mirrors 141, 142, 143, 144 and a beam splitter 147. In FIG. 1, mirror 142 is depicted as the mirror used as translation stage 152 and it is adjusted with motor 155; the function of the translation stage is to adjust the relative length of the optical paths 162, 164 reaching mirrors 141 and 142, for reasons hereinafter described.

A gas cell 161 is used to provide a sample for detection. The detection can occur across the entire beam path 162, 164 of either laser 111, 112, so it should be appreciated that gas cell 161 is but one non-limiting example of a technique for presenting a difference in the gas composition between the two beam paths. The gas cell 161 may be a sample of a known good gas or it may be a sample of an unknown environment for testing. A valve 165 and vacuum pump 167 are used to extract gas from the sample in the gas cell 161. Valve 165 and precision leak valve 169 are in fluid communication with gas chamber 161, to allow for controlled re-pressurization of gas chamber 161.

Light from lasers 111, 112 pass along two light paths 162, 164, with beam splitter 147 causing a portion of the light to reflect from mirror 141, passing through gas cell 161, and a portion of the light to reflect from mirror 142, not passing through gas cell. Adjustments are made at the translation stage 152 in the direction as indicated by arrow 154 in order to obtain an interference pattern between light reflecting from mirrors 141 and 142.

Gases that are present in the atmosphere will produce different interference patterns, where the two long beams are set where the atmospheric gases are not uniformly diffused. The interference patterns can be used to distinguish between safe and possibly dangerous air using this method. The diffusion pattern itself over time can be made to be part of the interferometer signature (e.g., for detection by a neural network). For example $NH_3$ and $H_2S$ (if these gases were present) have characteristic diffusion patterns that are easily discernable using this method. As a result, it is possible to establish long light paths for obtaining diffusion differential patterns. Such long light paths can extend, by way of non-limiting example, over several hundred meters.

The interference pattern is the result of light waves having a shorter wavelength in a solid or gaseous medium than they do in a vacuum. If the wavelengths in air and vacuum are respectively $\lambda_{air}$ and $\lambda_{vac}$ then they are related by $\lambda_{air}=\lambda_{vac}/n_{air}$, where $n_{air}$ is the index of refraction of air. When the gas cell in the arm between beam splitter 147 and mirror 141 is evacuated fully, the number of waves along the evacuated length L of the cell is given by $N_{vac}=2L/\lambda_{vac}$, where waves traveling along both directions in the cell are being counted. When air is let into the gas cell to reestablish one atmosphere (1 atm) of air pressure, the number of waves contained within the air volume is given by $N_{air}=2L/\lambda_{air}$. The difference $N=N_{air}-N_{vac}$ can be written as:

$$N=2L/\lambda_{air}(1-(1/N_{air})) \quad (1)$$

where N is the increase in the number of waves present in the light path arm between beam splitter 147 and mirror 141 as one atmosphere (1 atm) of air pressure is re-established in the gas cell.

This increase in the number of waves in the gas cell arm leads to $N_{HeNe}$ and $N_{GreNe}$ fringes moving over the detectors 131 and 132, respectively. The number of waves can be recorded as a fringe pattern by the process electronics (see FIG. 2), as described below. By substituting $N_{HeNe}$ and $N_{GreNe}$ into equation (1), one can determine the index of refraction of air at the HeNe and GreNe wavelengths.

Figure 2:
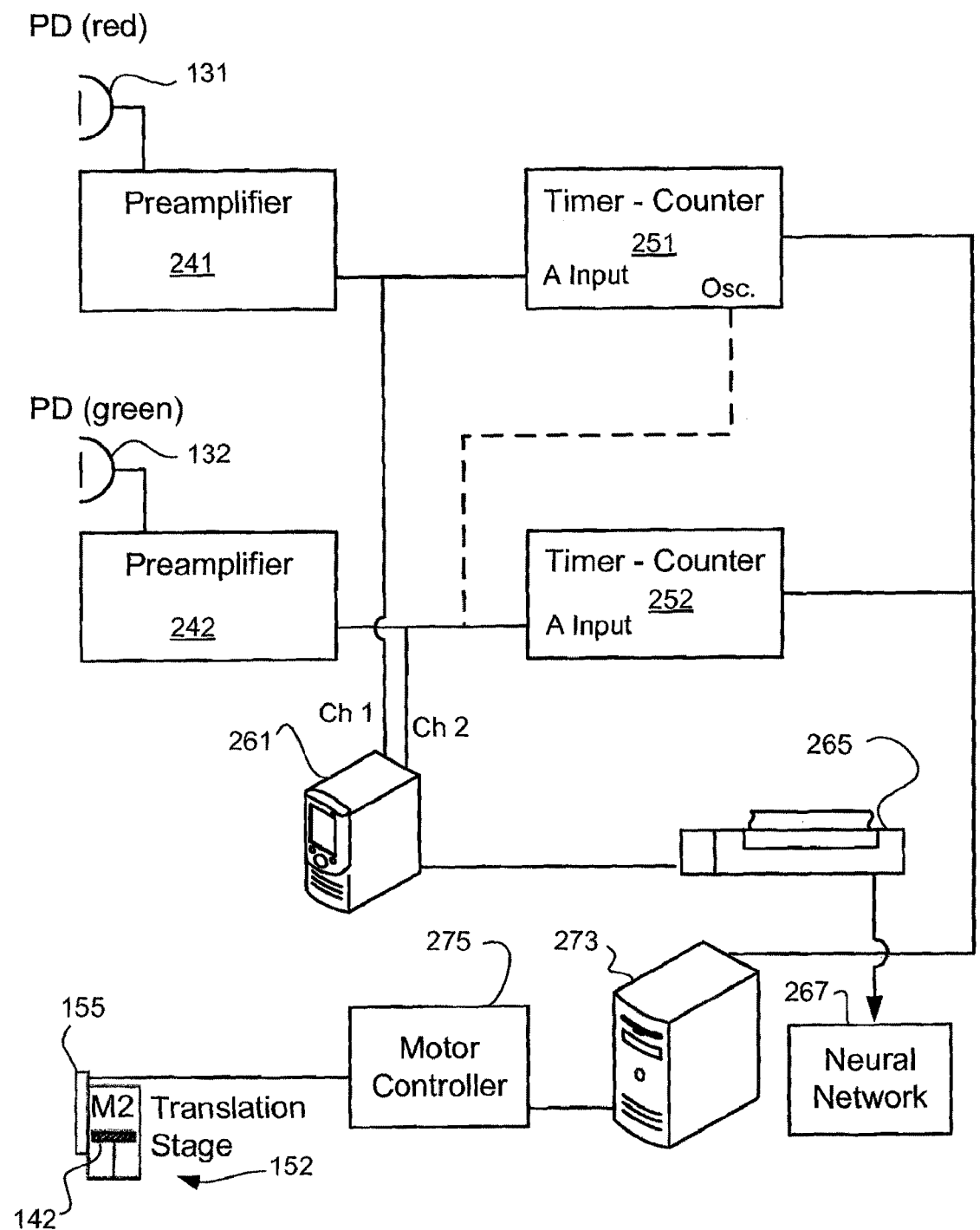
FIG. 2 is a block diagram of the signal processing electronics used to amplify, count and display the fringe pattern signals at the two photodiode detectors for the system shown in FIG. 1.

Referring now to FIG. 2, a block diagram of the signal processing electronics used to amplify, count and display the fringe pattern signals at the two photodiode detectors used is shown. Depicted are photodetectors 131, 132, low-noise preamplifiers 241, 242 which include a band pass filter (not separately shown), a pair of timer-counters 251, 252 (in one embodiment, HP 5326B and HP 5327B timer-counters can be used) and an oscilloscope 261 (in one embodiment, a Tektronix 2211 oscilloscope can be used). The oscilloscope 261 has an output connection to plotter 265 (Tektronix HC 100 plotters can be used in one embodiment of the present invention). Also depicted is the aforementioned translation stage 152 and motor 155, a computer 273 and motor controller 275. Computer 273 is responsive to the signal outputs from the preamplifiers 241, 242 and is used to control adjustment of the translation stage 152. Computer 273 controls the adjustment of the translation stage by use of a feedback control mechanism or circuit. Computer 273 may also incorporate the neural network. The user can align the external output of timers 251, 252 initially and then let the neural network register the interference patterns and their evolution.

During operation of the system 10, preamplifiers 241, 242 are set for direct current (DC) coupling and initially with their band pass filters set for the range 100-3000 Hz. Timer-counters 251, 252 can be operated by setting start and stop positions. When set to the start positions, timer-counters 251, 252 will count fringes until each counter is set manually to the stop position. Before making index of refraction measurements, oscilloscope 261 is checked to be sure that good quality fringe signals can still be seen on the oscilloscope when the translation stage is in motion. The translation stage is turned off or stopped when the fringe signals are properly adjusted.

Oscilloscope 261 is set in the "store" mode, and a Sec/Division switch on oscilloscope 261 is set to twenty milliseconds per division (20 ms/div). At this setting, if the Sec/Division calibrate knob (oscilloscope 261) is rotated to the uncalibrated position, the Sec/Division scale of the oscilloscope is expanded by a factor of 100 and the Sec/Division scale is now two seconds per division (2 s/div). This technique is useful for slowing down the time base of the oscilloscope. Oscilloscope 261 is now in Roll Mode and the display for oscilloscope 261 will contain twenty seconds of data moving slowly to the left in the manner of a strip chart.

The gas in gas cell 161 (FIG. 1) is evacuated for at least thirty seconds (30 s). This evacuation of the gas in gas cell 161 is given as a non-limiting example, and it is also possible to use any convenient technique to establish a possible differential of the gas mixture. This is intended to result in comparing different mixtures, as opposed to comparing the mixture with a vacuum. If the oscilloscope 261 is set properly (i.e., as desired), one can observe many fringes passing by the photodiode detectors as the air is evacuated from the gas cell. When pumping is complete, the valve 165 leading from the vacuum pump 167 to the gas manifold and gas cell 161 is closed.

Valve 165 is opened to precision leak 169, enabling air to leak slowly into gas cell 161. At the same time, lasers 111 and 112 are activated to establish laser light paths 162, 164 for the system. As gas cell 161 returns to atmospheric pressure, it is possible to observe fringe signals develop rapidly and then more slowly on oscilloscope 261. By repeating the pump-down/leak procedure several times it should be possible to find a setting of precision leak valve 169 such that all fringes produced during the leak up period can be contained within the 20 second store window of the oscilloscope 261. When a satisfactory display of the fringe signals is obtained during the entire leak up period, the oscilloscope display trace is saved and plotted at plotter 265. The output from plotter 265 is analyzed by neural network 267, as depicted in FIG. 2.

A sampling amount, for example three measurements, is then made of the fringe patterns that occur during the leak-up process. A determination is made of the number of fringes $N_{HeNe}$ and $N_{GreNe}$ that occur during each leak-up measurement. The fringe patterns are used to determine the index of refraction of air at the HeNe and GreNe laser wavelengths using equation (1). By finding the mean and standard deviation of the index of refraction measurements of the sample at the index of refraction of air, the HeNe and GreNe laser wavelengths are determined. To make the aforementioned index of refraction calculation, the evacuated length L of the gas cell is measured.

Figure 3:
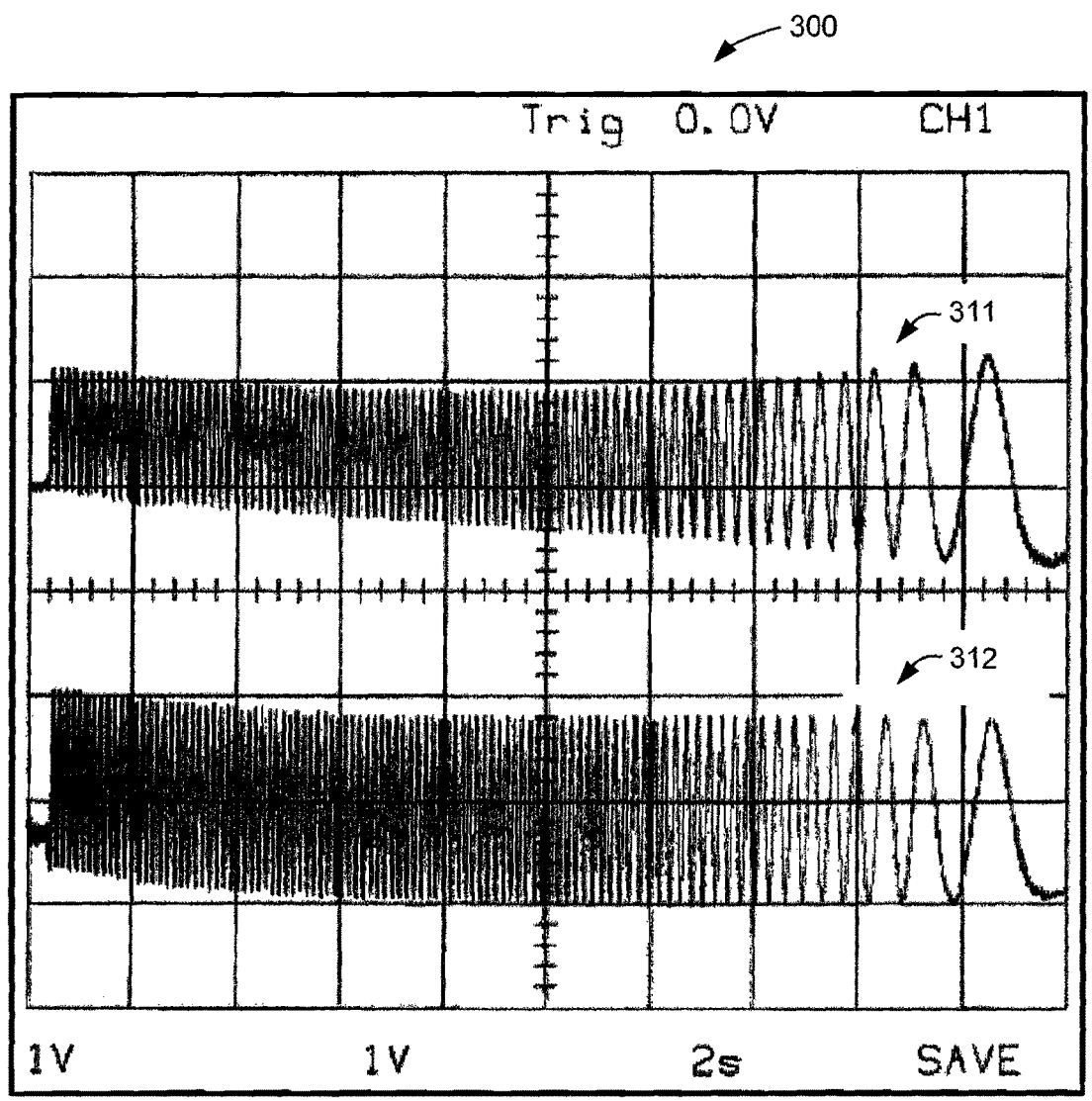
FIG. 3 is a depiction of a sample oscilloscope trace resulting from operation of the system shown in FIG. 1; and, FIG. 4 is a block diagram that is representative of methods according to several embodiments of the present invention.

FIG. 3 is a depiction of a sample oscilloscope trace 300 of the above-described process. Depicted are two differential fringe patterns 311 and 312, which are produced from different concentrations of a sample gas. It is noted that fringe pattern 312 has a higher frequency than fringe pattern 311—giving a signature for the refraction of air at these two different wavelengths. Note that fringe patterns are the patterns that result from operation of the HeNe and GreNe lasers, respectively. To determine whether (and if) certain gases are present in the atmosphere, fringe pattern 311 could be used as a reference fringe pattern and compared to fringe pattern 312, or vice versa. Or, fringe patterns could both be compared to known fringe patterns for HeNe and GreNe lasers, respectively, that correspond to standard atmospheric conditions, which are stored in the neural network.

As cited above, the output fringe patterns 311, 312 from plotter 265 can be interpreted and analyzed by a neural network 267. The exact differences between the fringe patterns 311, 312 depend on a number of factors, including the type and concentration of the gas sampled. A neural network can be used to interpret the variations in the fringe patterns 311 and 312, as described below, in order to recognize the type and amount of gases that are in the atmosphere. The approach to obtaining relevant information from such data is to use an intelligent learning system such as provided by an artificial neural network, in order to fuse and recognize the interference patterns produced by laser light at multiple fundamental frequencies whose travel time is attenuated by the target gases (e.g., poison gases) having unique and calibrated frequency-dependent signature patterns. One such neural network that could be used is a geodesic neural network, as described in the '049 application. Another such exemplary neural network can be the Knowledge Amplification Employing Structured Expert Randomization (KASER) neural network. The KASER neural network is described in U.S. Pat. No. 7,047,226, which issued to Stuart H. Rubin on May 16, 2006 for an invention entitled "System and Method for Knowledge Amplification Employing Structured Expert Randomization", and which is assigned to the same assignee as this patent application. As stated above, the '226 patent is hereby incorporated by reference herein.

It is noted that laser light is refracted (slowed) to a degree that depends on its frequency and the medium through which it travels. Thus, each gas will produce its own unique frequency-dependent signature pattern in the device below and it is furthermore hypothesized that this pattern will be in bijective correspondence with the relative concentration of pollutant(s). The use of feedback loops may be provided by neural network computing. Given sufficient concentrations of non-uniformly dispersed target gasses the use of feedback loops should serve to insure a device of great sensitivity in cases where feedback loops are used. If the gas functions to diffuse the beam, then it will be possible to rapidly pulse (e.g., Q-switch) the source beam. This follows because only the first photons are relatively (i.e., statistically) unscattered by the diffusing medium. The higher the pulse rate, the more first photons.

In an embodiment of the invention, an infrared laser such as an infrared $CO_2$ laser or semiconductor laser diode is used in conjunction with frequency-doubling crystals such as Lithium Niobate. The crystal is selected with due regard to its transmission characteristics. In the example, NaCl is used for infrared. Such a configuration could be used when it is desired to obtain broadband transmission. Also, included are beam splitters such as partially front-surfaced gold mirrors for infrared optics. Here, an attempt is made to minimize any absorption coefficient, so high quality broadband front-surface mirrors are selected. Furthermore, an attempt is made to obtain the best signature pattern resolution and the fundamental frequency h is maximized. The best signature pattern resolution will serve to maximize the number of transmitted harmonics, and would also be in the right range for many poisonous gases, e.g., Sarin gas. This fundamental frequency is often somewhere in the far infrared. The maximum frequency will be determined by the availability of suitable lasing materials and the transmission characteristics of the frequency-doubling crystal. It will also depend to a lesser extent on the frequency-absorption bands of the particular gases to be measured.

The neural network is trained on different "normal" atmospheric conditions, isolating the target or poisonous gases at different concentrations, as well as likely mixtures of target gases at different concentrations. The network is unique because using knowledge amplification technology, it is possible to minimize the number of training instances to a basis set. Thus, it is possible to reduce the number of training cases quadratically in the theoretical limit. This is described in the previously-cited '226 patent. The importance of this capability is driven home when dealing with extremely toxic nerve gases. When the laser based interferometer is used as in FIG. 1, the heterodyne or Nyquist frequencies are computed from a feedback loop, where initially, after the first loop the first-order harmonic frequencies are computed. Using several feedback loops (the exact number depending upon optical attenuation by the transparent mirrors), harmonic frequencies that correspond to lesser concentrations of gas can be detected. This is important when it is desired to detect toxic gases at extremely small concentrations. The greater the spectral coverage, the more sensitive the system. The KASER neural network becomes useful here because of its inherent capability to extrapolate from a basis of previously-seen cases so as to reduce the training and increase the predictive sensitivity.

The detection can also be made more sensitive if specific information is known in advance about what gases are sought to be detected. For example, ammonia has a few very narrow absorption lines, whereas Sarin gas exhibits a characteristic bell curve. By tuning the harmonic laser frequencies to the known refractive lines of ammonia, a much more sensitive ammonia detector is obtained, with only a slight loss in sensitivity to Sarin gas.

By passing the laser through miles of atmosphere, it is possible to obtain a more sensitive detector. Here it will be advantageous to train the detector neural network to negate the effects of atmospheric $CO_2$ and $H_2O$, and possibly $O_3$, $NO$, $NO_2$, $N_2O_4$, hydrocarbons and other pollutants, which could represent noise in this embodiment. By carefully selecting frequencies not attenuated by these pollutants, but refracted by the target gases (e.g., poison gases), it is possible to obtain a more sensitive detector.

Each target gas (e.g., poison gas) has a signature over several frequencies being used in the interferometer. The use of multiple harmonics greatly increases the sensitivity of the device by eliminating false positives and allows for the neural net to find the pattern and filter out noise.

Lithium Niobate may possibly absorb considerable ambient energy. There may be alternate crystals and combinations of crystals that can be used to increase the sensitivity of the device further. The use of a pulsed laser can create a much higher initial intensity yielding a greater number of harmonics; thereby increasing the device sensitivity in conjunction with the neural network, but beam divergence is higher for pulsed lasers than for continuous-wave lasers.

The subject technique contrasts with photo-acoustic methods, which must deal with noise in the form of quantum photonic absorption from Brownian molecular collisions (and pollutants). With the laser interferometer, it is possible to select the wavelengths. With the photo-acoustic method, there is no equivalent method for increasing signal to noise that can potentially work as well.

Figure 4:
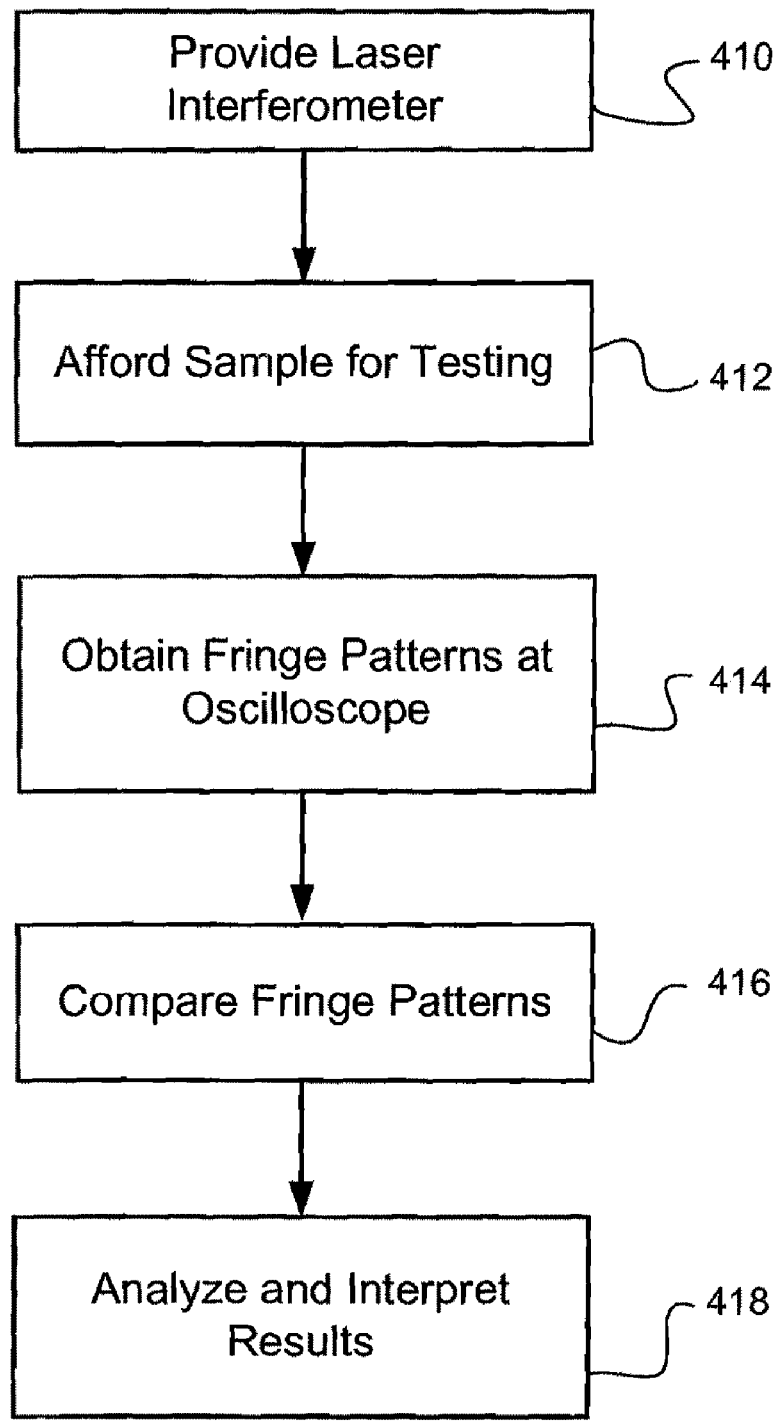

Referring now to FIG. 4, a representative block diagram illustrating the methods according to several embodiments of the present invention is shown. As shown, the initial step 410 of the method is to provide a laser interferometer for measuring atmospheric wavelength. The laser interferometer could be a Michelson interferometer having the structure described above, wherein two lasers are used to generate two fringe patterns. The fringe patterns can then be compared to each, as described below, or to previously stored reference fringe patterns according to various embodiments of the invention. Alternatively, a laser interferometer could be used wherein one laser generates a respective fringe pattern, which is then compared to previously stored patterns.

Another step of the methods is to afford a sample for testing, as shown at block 412 of FIG. 4. One way to accomplish this step is to activate the lasers for the Michelson interferometer and to simultaneously evacuate and fill a gas chamber containing the test sample, as described above. Operation of the interferometer results in fringe patterns, which are then obtained at an oscilloscope 261 (See Step 414).

The fringe patterns are compared at step 416, either to each other (designating one fringe pattern 312 as a reference for a standard atmosphere and comparing the fringe pattern 311 to fringe pattern 312. Or, fringe patterns 311 and 312, which result from operation of the HeNe and GreNe lasers, respectively, could be compared to known fringe patterns that resulted from operation of HeNe and GreNe lasers in a predetermined standard atmosphere. Finally, the fringe patterns are analyzed and interpreted by a neural network, as depicted by step 418. The use of the neural network allows for an extremely quick and effective evaluation process. For one embodiment on the invention, a KASER neural network can be used for the present invention. For other embodiments, a geodesic neural network can be used to analyze the fringe patterns.

It will be understood that many additional changes in the details, materials, steps and arrangement of parts and steps, which have been herein described and illustrated to explain the nature of the invention, may be made by those skilled in the art within the principal and scope of the invention as expressed in the appended claims. Thus, while the laser-based gas spectral analyzer and methods therefore, as shown herein and described in detail, is fully capable of obtaining the objects and providing the advantages above stated, it is to be understood that the presently preferred embodiments are merely illustrative of the invention. As such, no limitations are intended other than as defined in the appended claims.

What is claimed is:

1. A method for detecting a target gas in an atmosphere, the method comprising the steps of:
   A) providing a laser interferometer implemented across plural optical paths;
   B) affording a gas sample across at least a portion of one of said optical paths;
   C) obtaining a differential fringe pattern with said interferometer;
   D) comparing said differential fringe pattern with a reference fringe pattern that is representative of said atmosphere; and,
   E) analyzing said differential fringe pattern and said reference fringe pattern with an artificial neural network to detect said target gas, said neural network being selected from the group consisting of geodesic and KASER neural networks.

2. The method of claim 1 wherein said step A) is accomplished with a Michelson interferometer.

3. The method of claim 2, wherein said step A) further comprises the steps of:
   A1) using a plurality of laser transmitters in the laser interferometer, at least one of said plurality of laser transmitters transmitting at a different optical frequency from another one of said plurality of laser transmitters;

A2) utilizing at least two photodetectors corresponding to respective ones of the different optical frequencies; and A3) providing a beam splitter in the optical paths separating at least two of the plural optical paths according to the respective ones of the different optical frequencies.

4. A gas detector comprising:

a laser interferometer having a plurality of optical paths;

a gas sample chamber positioned in at least one of said optical paths and outside of at least another of said plural optical paths;

detectors for receiving a plurality of optical signals corresponding to said optical path with said gas sample chamber positioned therein, and to said another of said optical paths;

said detectors generating a differential fringe pattern as a detection output, said differential fringe pattern resulting from differences in said optical characteristics that are representative of materials present in said sample chamber; and a neural network for analyzing said differential fringe pattern and a predetermined reference fringe pattern, said neural network being selected from the group consisting of geodesic and KASER neural networks.

5. The apparatus of claim 4, wherein said gas sample chamber is filled with a reference sample gas.

6. The apparatus of claim 4 wherein said laser interferometer is a Michelson interferometer.

7. A non-transitory computer readable medium containing computer instructions stored therein for causing a computer processor to perform a method of detecting a target gas in an atmosphere, the method comprising the steps of:

A) providing a laser interferometer implemented across plural optical paths;

B) affording a gas sample across at least a portion of one of said optical paths;

C) obtaining a differential fringe pattern with said interferometer;

D) comparing said differential fringe pattern with a reference fringe pattern that is representative of said atmosphere; and, E) analyzing said differential fringe pattern and said reference fringe pattern with an artificial neural network to detect said target gas, said neural network being selected from the group consisting of geodesic and KASER neural networks.

8. The computer-readable means of claim 7 wherein said step A) is accomplished with a Michelson interferometer.

9. The computer-readable means of claim 7 wherein said step A) further comprises the steps of:

A1) using a plurality of laser transmitters in the laser interferometer, at least one of said plurality of laser transmitters transmitting at a different optical frequency from another one of said plurality of laser transmitters;

A2) utilizing at least two photo detectors corresponding to respective ones of the different optical frequencies; and A3) providing a band splitter in the optical paths separating at least two of the plural optical paths according to the respective ones of the different optical frequencies.

* * * * *